United States Patent
Beggs

(12) 
(10) Patent No.: US 6,167,821 B1
(45) Date of Patent: Jan. 2, 2001

(54) METHOD AND APPARATUS FOR FUMIGATING SOIL

(76) Inventor: Robert D. Beggs, 9897 Taft Rd., Plainfield, WI (US) 54966

(*) Notice: Under 35 U.S.C. 154(b), the term of this patent shall be extended for 0 days.

(21) Appl. No.: 09/141,700

(22) Filed: Aug. 28, 1998

Related U.S. Application Data

(60) Provisional application No. 60/097,590, filed on Aug. 24, 1998.

(51) Int. Cl.$^7$ ................................................ A01C 23/00
(52) U.S. Cl. .................................... 111/124; 111/118
(58) Field of Search ................................ 111/123, 118, 111/127, 119, 120, 121, 124, 126; 239/551, 754, 271

(56) References Cited

U.S. PATENT DOCUMENTS

| | | | |
|---|---|---|---|
| 3,170,421 | * 2/1965 | Norris et al. | 111/123 X |
| 4,033,270 | * 7/1977 | Bezzerides et al. | 111/118 |
| 4,055,126 | * 10/1977 | Brown et al. | 111/123 X |
| 4,193,356 | * 3/1980 | Vehe et al. | 111/118 |
| 4,211,175 | * 7/1980 | Van Der Lely | 111/118 X |
| 4,577,568 | * 3/1986 | Netsch | 111/123 |
| 4,926,767 | * 5/1990 | Thomas | 111/123 X |
| 4,994,487 | 2/1991 | Haglund | 514/476 |
| 5,075,332 | 12/1991 | Haglund | 514/476 |
| 5,355,815 | * 10/1994 | Monson | 111/127 X |
| 5,407,134 | * 4/1995 | Thompson et al. | 111/118 X |
| 5,605,105 | * 2/1997 | Clark et al. | 111/127 |
| 5,890,445 | * 4/1999 | Ridgley | 111/123 X |
| 5,996,514 | * 12/1999 | Arriola et al. | 111/150 X |

* cited by examiner

*Primary Examiner*—Victor Batson
(74) *Attorney, Agent, or Firm*—Dorsey & Whitney LLP

(57) ABSTRACT

A method and apparatus for fumigating soil in a manner to prevent or minimize escape of fumigating gases and in a manner to facilitate the planting of a cover crop at the time of fumigation. An apparatus for simultaneously treating soil with soil fumigant material applied at a full application rate includes a fumigant material applicator applying fumigant below the surface of the soil at a rate of at least 10 gallons per acre. The apparatus further includes a soil leveling apparatus, and a soil packer positioned between the applicator and packer. The apparatus further includes with a cover crop seed planter, with the soil leveling apparatus and packer being positioned between the applicator and planter.

24 Claims, 3 Drawing Sheets

METHOD AND APPARATUS FOR FUMIGATING SOIL

This application claims benefit to Provisional application No. 60/097,590 filing date Aug. 24, 1998.

BACKGROUND OF THE INVENTION

1. Field of the Art

The present invention relates generally to a method and an apparatus for fumigating soil, and more particularly, to a method and apparatus for fumigating soil at substantially full rates in which a cover crop can be planted at the time of fumigation.

2. Description of the Prior Art

Soil fumigant is used to control undesirable soil borne organisms in the production of vegetables, ginseng and other high value crops. Application of known fumigants to the soil prior to planting is known to be effective as a fungicide, pesticide and herbicide for the control of germinating weed seeds, blights, insects and other undesirable diseases and pests. A fumigant commonly used is metham sodium (sodium methyldithiocarbamate) which is also known as metam sodium, metam or metham. These fumigants are commercially available and some are marketed under the names Metam, Sectagon II, Soil-Prep, Vapam and V.P.M.

Metham sodium and other fumigants are commonly applied at rates of about 10 to 100 gallons per acre, depending upon soil conditions, to effectively control the various soil organisms that are detrimental to the desired high value crop. Application of the fumigant at rates less than this results in the increased occurrence of weeds, diseases, insects and other undesirable organisms. Because of the desire to apply the fumigant at a sufficiently high rate to control all soil borne organisms and essentially sterilize the soil, and because of the highly toxic nature of the fumigant, it has generally been acknowledged and accepted that planting of crops in the fumigated soil could not take place until 14 to 21 days after conventional full rate application to well drained soils of light to medium texture, for 30 days after conventional application to soils that are heavy or especially high in organic matter, or until at least 60 days after conventional application where a fumigant dosage of greater than 100 gallons per acre has been applied. Because of this necessary delay in planting, and because of the desire to avoid unnecessary delays in spring planting of the high value crop, much of the soil fumigation has been done in the fall. This enables the fumigant to be applied at full rate and allows sufficient time for the fumigant to disperse and become non-toxic prior to planting in the spring.

While fall fumigation facilitates early spring planting, problems continue to exist. First, upon application, the generally liquid metham sodium is converted into a gaseous, tear gas type substance. A key to successful application has been to keep the product sealed in the soil as much as possible to limit the amount of toxic gas escaping as much as possible. However, conventional thinking was that there would always be some gas escaping and the odor problems resulting from this escaping gas were a necessary evil.

Secondly, wind erosion has always been a significant problem with soil fumigation, particularly when done in the fall. For the reasons discussed above, conventional thinking forced farmers to leave a field essentially untouched and completely bare for at least two to three weeks after fumigation to allow the product to do its job and before even attempting to plant a cover crop such as annual rye or other fast growing cover crops for the purpose of reducing wind erosion and providing a crop that could be tilled into the soil before planting the high value crop the following spring.

One attempt at addressing the problems created by soil fumigation was to pull a soil packer behind the fumigant applicator in an attempt to seal the fumigated soil as much as possible and to limit the escape of toxic fumigating gases. While this had some beneficial effects, the packer tended to seal only the ridges or high portions of the fumigated soil which the packer contacted with sufficient packing force. Further, it had little or no effect at controlling wind erosion.

Others such as Washington State University Foundation in U.S. Pat. No. 4,994,487 have attempted to address the problem by significantly reducing the application rate of the fumigant to levels which are insufficient to retard the growth of a plant from the seed or vegetative material. With this method, fumigation could occur in the spring and the high value crop could be planted at or prior to the time of fumigation. A limitation of this solution, however, is the fact that significantly reduced amounts of the fumigant, on the order of less than five gallons per acre, are utilized. Thus, although these reduced amounts are intended to avoid significant retardation of the growth of the desired high value plant, they also fail to retard the growth of many undesirable plants and other organisms as well.

Accordingly, there is a need in the art for an improved method and apparatus for applying fumigant to control soil borne organisms and more specifically, for a method and apparatus for applying fumigant at substantially full application rates, without experiencing the unnecessary odors and escape of fumigating gas, and thus reduced efficiency of the fumigant, and in a manner which facilitates the planting of a cover crop at the time of fumigation to control and limit wind erosion.

SUMMARY OF THE INVENTION

In contrast to the prior art, the present invention relates to a method and apparatus for applying soil fumigant at substantially full rates in which a cover crop can be planted at the time of fumigation. By facilitating this, the customer can have an established cover crop within seven to ten days following fumigation instead of the usual four to six weeks.

In accordance with the preferred embodiment of the present invention, this is accomplished by applying the fumigant at substantially full rates and below the surface of the soil. Preferably, the fumigant is applied via spray or otherwise at a point at least about 2 to 12 inches below the surface of the soil. This application is immediately followed by smoothing out and leveling any ridges or clumps that may have been formed during the fumigating step. This is followed by packing and sealing the soil to preclude the escape of any fumigating gas. Because the soil has been smoothed prior to packing, the packer contacts substantially the entire surface area of the soil that has been fumigated, rather than just the ridges or high points in accordance with the prior art.

Finally, the packer is followed directly by planting the seeds of a cover crop at a relatively shallow depth of preferably no deeper than about two inches. Preferably, the planting is accomplished by a seed drill of a type which is capable of accurate depth planting.

The equipment in accordance with the preferred embodiment of the present invention includes a conventional fumigant applicator which is capable of applying fumigant to the soil at a depth of about 2 to 12 inches below the top surface of the soil. This is followed immediately in succession by a means to smooth out the hills and clumps of dirt in the soil such as a rotating harrow or the like. This is in turn followed by a packer or pulverizer which is capable of packing the soil and essentially sealing the fumigant within the soil. Finally, a conventional seeder such as a press drill or other accurate depth drill immediately follows the packer and plants the seeds of the cover crop at a relatively shallow depth no greater than about two inches below the top surface of the soil.

Further features of the present invention include an improved fumigation distribution head and the utilization of radar and computer controlled application equipment for ensuring and maintaining exact levels of fumigant application regardless of the speed at which the fumigant applicator is moving.

Accordingly, it is an object of the present invention to provide an improved method and apparatus for fumigating soil.

Another object of the present invention is to provide a method and apparatus for fumigating soil which minimizes the escape of fumigant gas and thus minimizes undesirable odors.

Another object of the present invention is to provide a method and apparatus for fumigating soil at substantially full application rates while still permitting the seeding of a cover crop at the time of fumigation.

A further object of the present invention is to provide a method and apparatus for applying soil fumigant at substantially full rates in the fall along with the seeding of a cover crop to prevent wind erosion.

A still further object of the present invention is to provide an improved application spray head.

These and other objects of the present invention will become apparent with reference to the drawings, the description of the preferred embodiment and the appended claims.

DESCRIPTION OF THE PREFERRED EMBODIMENT

Figure 1:
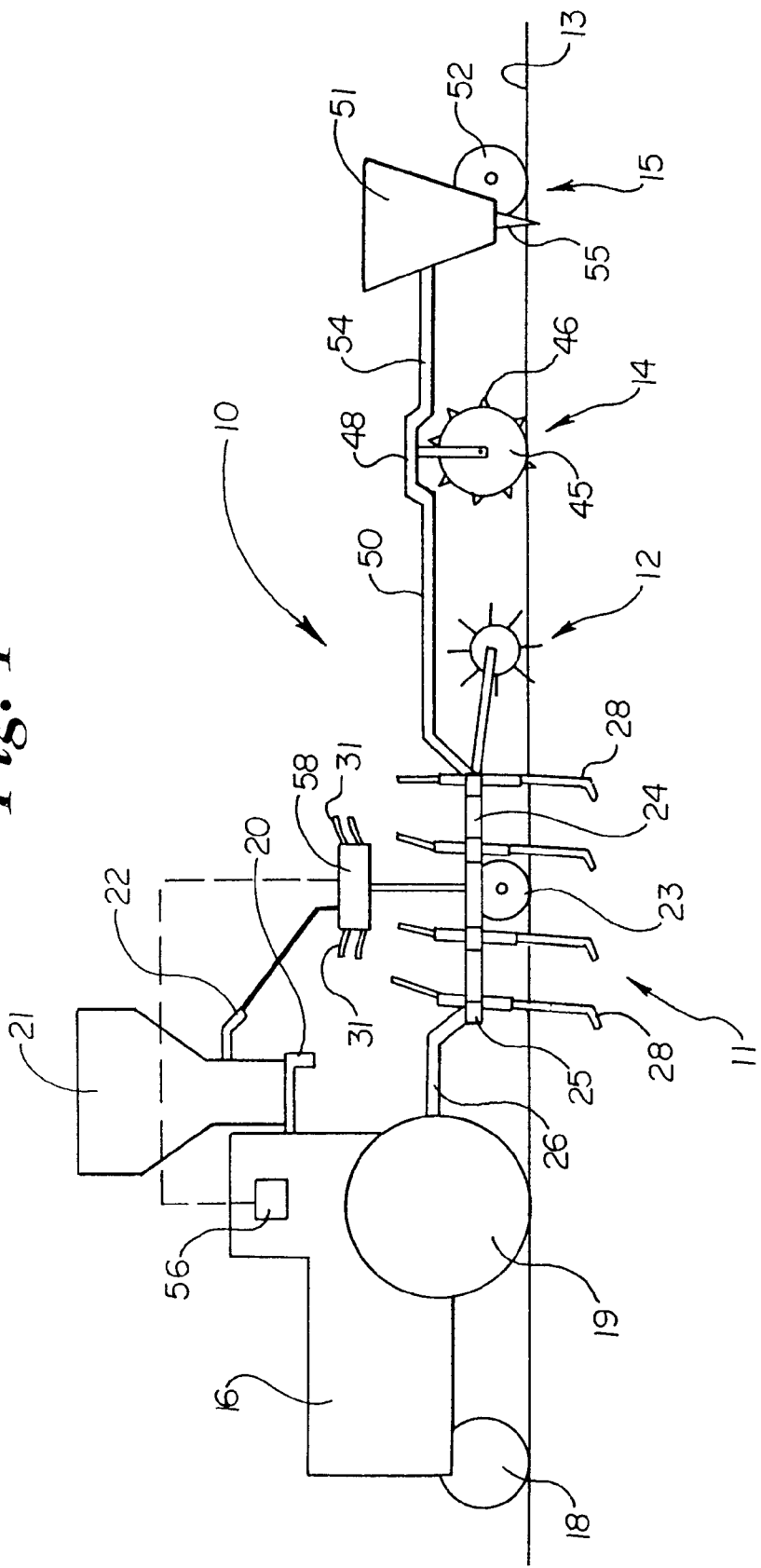
FIG. 1 is a side elevational schematic view of the apparatus or implement assembly in accordance with the present invention.

In accordance with the method and apparatus of the present invention, soil can be fumigated at substantially full rates in a manner which substantially seals the soil to prevent the escape of fumigating gases and which facilitates the planting of the cover crop at the time of fumigation. The apparatus or implement in accordance with the present invention is illustrated schematically in FIGS. 1 and 2 by the general reference character 10. As shown, the apparatus or implement 10 in accordance with the preferred embodiment includes a fumigating device 11, a means 12 for smoothing out and leveling off the ridges and the clumps of the soil following fumigation, a packer or pulverizer 14 for packing and sealing the soil to prevent or minimize the escape of fumigating gases and a seed drill 15 for planting a cover crop. The components 11, 12, 14 and 15 of the implement in accordance with the preferred embodiment are connected in succession as shown. The process of fumigating, leveling, packing and seeding is accomplished in a single pass across the field. The entire implement 10 is towed by a tractor or other vehicle 16 supported by wheels 18 and 19. In the preferred embodiment, the towing vehicle 16 is also provided with a support bracket or other means 20 for supporting a fumigating solution supply tank 21. The tank 21 includes an exit line 22 or other means for conveying fumigating solution from the tank 21 to the fumigating component 11.

The fumigating applicator or applicating component 11 may comprise a variety of different types of fumigating concepts which are known in the art. In the preferred embodiment, the component 11 is a fumigant applicator which applies the fumigant by spraying the fumigant into the soil below the top surface. As shown, the fumigating component 11 includes a plurality of horizontally extending support members 24 which are braced and connected by a plurality of spaced members 25. The forward end of the component 11 is connected with the towing vehicle 16 by a draw bar or hitch member 26. The component 11 includes a plurality of wheels 23 for support during transport and/or for depth control. A plurality of chisel tooth plows or tines 28 are connected with the frame members 24. During a fumigating operation, the chisel plows 28 are lowered into the soil at a depth of between 2 inches and 12 inches and preferably greater than 6 inches.

Figure 3:
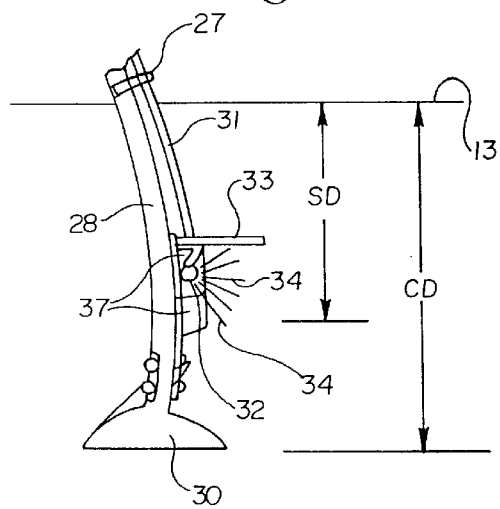
FIG. 3 is a fragmentary view of a means, including the spray head with portions broken away, for applying the fumigant in accordance with the present invention.

As shown best in FIG. 3, the chisel tooth plow includes an elongated tine portion 29 which has its upper end connected by a conventional means to a frame member of the component 11. The lower end of the tine portion is provided with a conventional chisel tip 30. Connected with the tine portion 28 by a connecting member 27 is a stainless steel fumigant supply conduit 31 having a spray nozzle 32 at its distal end. In the preferred embodiment, the spray nozzle 32 is designed to spray fumigant 34 rearwardly in all directions in a generally cone configuration. Preferably, the chisel plow end 30, during fumigation, is lowered to a depth "CD" (FIG. 3) between 2 and 12 inches below the soil surface 33, and preferably to a depth CD greater than 6 inches. Most preferably, the chisel point 30 should be at a depth of about 10 to 12 inches. The fumigant is preferably sprayed at a depth "SD" (FIG. 3) below the top of the soil so that the spray reaches the bottom depth of the chisel plow 30, but does not reach the top surface of the soil. Thus, in the preferred process, the spray of fumigant is kept totally below the top surface of the soil. Preferably, the depth SD is about 2 to 10 inches and most preferably about 4 to 8 inches so that the spray depth SD is about 3 to 5 inches above the bottom chisel plow 30. In the most preferred embodiment, the chisel plow 30 is at a depth CD of 12 inches and the nozzle 32 is at a depth SD of about 8 inches so that the nozzle 32 sprays fumigant 34 up and down from the nozzle about 4 inches each way.

Figure 7:
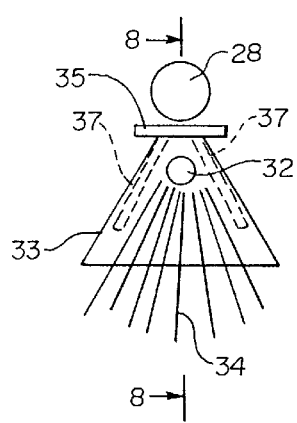
FIG. 7 is an elevational view of the application spray head in accordance with the present invention.
Figure 8:
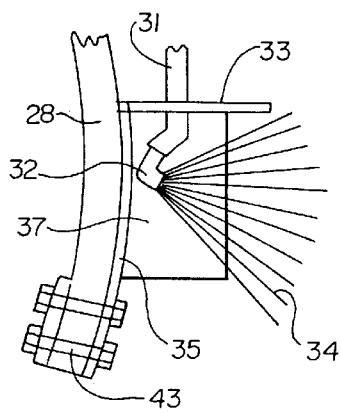
FIG. 8 is a view, partially in section as view along the section line 8—8 of FIG. 7.

The application spray head in accordance with the present invention is shown best in FIGS. 7 and 8. The spray head includes a support member 35 which is positioned immediately rearwardly and adjacent to the rearward edge of the tine 28 and is connected to the tine by a pair of bolts 43 as shown best in FIG. 8. Rigidly secured near the upper end of the support member 35 is a generally triangular shaped flange portion 33 which receives the lower end of the supply conduit 31. The flange 33 is designed primarily to prevent dirt from falling into the spray area which has been separated by tine portion 28. As best illustrated in FIG. 7, a pair of spreader ears 37 are rigidly secured to the rearward surface of the support member 35 and extend downwardly below the bottom surface of the flange 33. The spreader ears 37 diverge outwardly from the support member 35 to keep the dirt from falling into the nozzle 32 and to allow the spray 34 from the nozzle 32 to be distributed in all directions. Essentially, the flange 33 and the spreader ears 37,37 form a spray cavity as the vehicle and tine 28 move forwardly through the soil. With this configuration, a single spray nozzle may be utilized. The particular spray nozzle 32 can be a variety of spray nozzles known in the art; however, the spray nozzle utilized in the present invention is a stainless steel Whirljet nozzle which is capable of spraying a generally conical spray pattern.

The fumigating component 11 described above is common in the art. The chisel plow utilized in the preferred embodiment may be a conventional chisel plow such as the CONSER-TILL or the MULCH-TILL chisel plows of Case IH.

During the fumigation step, relatively large ridges and valleys are formed in the soil by the chisel plow members 28. Further, clumps of sod and dirt are often turned up creating a relatively irregular surface. The soil leveling apparatus or component 12 is designed to smooth out the soil surface 13 so that the trailing packer 14 can pack and seal the entire soil surface and the cover crop can be planted at an accurate depth. If the soil is not smoothed out and leveled and the ridges and clumps substantially removed, the packer 14 contacts only the higher surfaces of the soil surface 13 and fails to effectively seal the soil surface.

Figure 5:
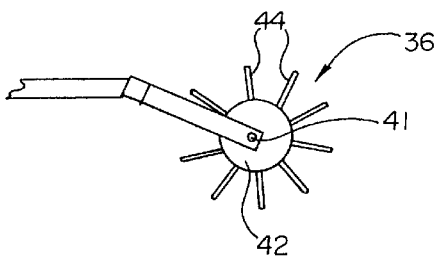
FIG. 5 is an elevational end view of the rotating harrow of FIG. 4 as viewed in the direction of the longitudinal axis of the harrow and the arrow 5 of FIG. 4.
Figure 4:
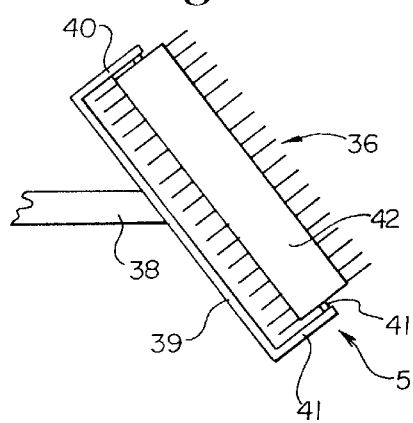
FIG. 4 is an elevational view of a rotating harrow used in the present invention as a means for smoothing the soil after fumigation.
Figure 6:
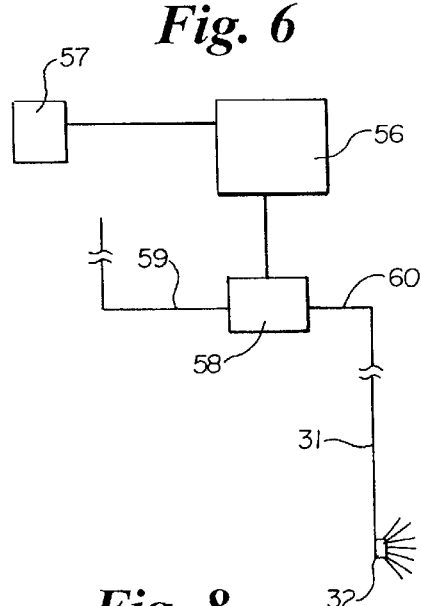
FIG. 6 is a schematic illustration of a control mechanism for controlling the application of fumigant in accordance with the present invention.

It is contemplated that a variety of smoothing or leveling means may be used in accordance with the present invention such as conventional drags, etc. In the preferred embodiment, however a rotating harrow mechanism is used. As shown best in FIGS. 2, 4 and 5, the preferred rotating mechanism of the present invention includes a plurality of rotating harrow sections 36 which are directly connected with a rearward portion of the fumigating component 11 by connection members 38. Each of the harrow sections includes a generally U-shaped frame comprising a horizontally extending frame bracket member 39 rigidly connected near its midpoint to the connecting member 38 and disposed at an angle relative to the direction of travel of the implement. Extending from the bracket member 39 at each of its ends is an end bracket section 40 for rotatably supporting the rotating harrow member 36 at the rotation axis 41. Each of the harrows 36 includes an elongated cylindrical portion 42 and a plurality of tines or spikes 44 extending radially outwardly from the cylindrical portion 42 throughout the entire length and surface of the member 42.

Figure 2:
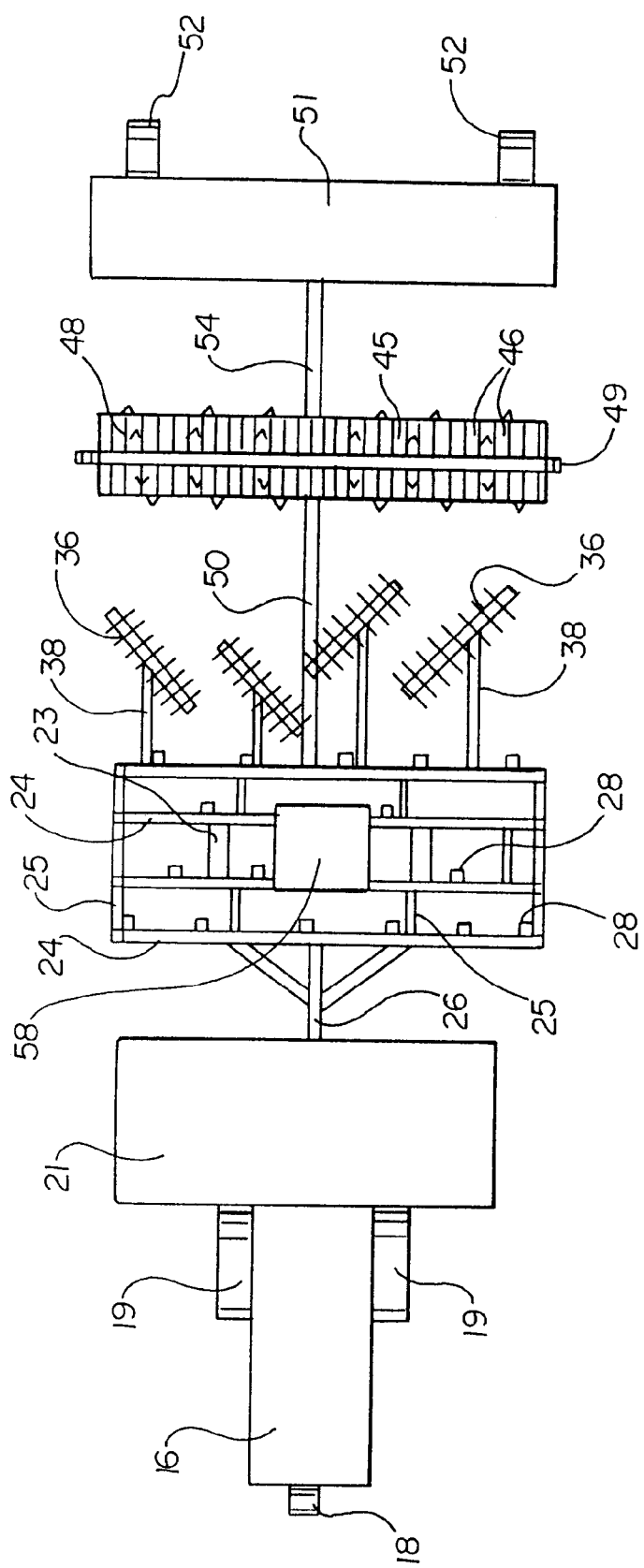
FIG. 2 is an elevational schematic plan view of the apparatus or equipment assembly in accordance with the preferred embodiment of the present invention.

The harrow sections 36 are not externally driven, but are driven as a result of the engagement of their tines 44 with the top surface of the soil. As the implement 10 is towed during operation, engagement of the harrow tines 44 with the soil surface causes the harrow to rotate. However, because each of the harrow sections is positioned at an angle relative to the direction of travel, the rotation of the tines move at an angle across the soil surface thereby leveling out ridges and valleys and substantially removing clumps of dirt that may accumulate. The rotating harrows are disposed at an angle to the direction of travel of between about 20 and 70 degrees and more preferably between about 30 and 60 degrees. The leveling means 12 may be comprised of a separate implement towed by a single hitch member behind the fumigating device 11 or can be directly connected with a rearward portion of the component 11 as shown in FIGS. 1 and 2. The harrow utilized in the preferred embodiment is a Phoenix rotary spike harrow.

After the soil has been smoothed and leveled by the rotating harrow, it is packed, or pulverized and packed, by the packer 14. The packer 14, in accordance with the present invention, can comprise any conventional packing means known in the art providing it has sufficient packing force to effectively seal the soil to prevent the escape of fumigating gases.

The packer 14 in accordance with the preferred embodiment of the present invention is what is known as a Brillion pulverizer comprised of a plurality of adjacent packer/pulverizer wheels 43 forming a roller 45, or a plurality of roller sections, extending across the entire width of the implement. In the preferred embodiment, the wheels 43 of the roller 45 are provided with a plurality of protruding portions 46 on their outer surface of the roller 45 to assist in the packing process and in pulverizing clumped soil that may exist. The packer 14 of the present invention includes a generally U-shaped frame comprising frame members 48 and 49 which are conventional in the art for supporting and guiding the roller 45. The frame member 48 is connected with a draw bar or hitch member 50 which, in the preferred embodiment, is intended to be connected directly to a rearward portion of the fumigating component 11. It is contemplated that various other packers or packers/pulverizers may be utilized such as conventional plow packers or the like providing they have sufficient weight and packing force to effectively seal the soil to prevent the escape of fumigating gases. Unless otherwise indicated, the term "packer" as used herein means a packer as well as a packer/pulverizer.

The seeding component or seed planter 15 of the implement 10 is a conventional seed drill which is capable of seeding a cover crop or any other seed that is desired. As shown, the seeding component 15 in accordance with the preferred embodiment includes a seed hopper 51 for carrying the seeds which are intended to be sown, a pair of support wheels 52 and a draw bar or hitch member 54 which is intended to be connected directly to a rearward portion of the packer component 14. The seeding component 15 also preferably includes a drill component 55 for planting the seed at a desired depth below the top surface of the soil.

Although a variety of different types of seeders and drills may be utilized, the seeding component 15 in accordance with the preferred embodiment is a press drill or the like which is capable of seeding the seeds at an accurate depth below the top surface of the soil. Preferably this depth is less than 2 inches deep, more preferably less than 1 inch deep, and most preferably about ½ inch deep. In general, the deeper the planting depth, the more likely it is that the cover crop seed will be adversely affected by the fumigating gases. It has been found, however, that when the soil is previously leveled and packed as described above, planting at a depth of less than 2 inches, more preferably at 1 inch or less, and most preferably at about ½ inch results in a cover crop which is not adversely affected or only minimally adversely affected, by the fumigating gases.

A further feature of the present invention is the provision of an accurate control mechanism for accurately controlling the application of the fumigant in relation to the speed of the vehicle. This means includes a conventional precision control console or unit 56 which may be mounted to the cab of the touring vehicle for controlling the flow of fumigating solution from a source or supply conduit 59 to a delivery conduit or line 60. The delivery line 60 is in turn connected with the various fumigating conduits 31 which supply fumigant through the nozzle 32 as shown in FIG. 3. In the preferred embodiment, the control mechanism includes a conventional motorized, electronically controlled flow meter or valve 58 and a means 57 for sensing the ground speed of the component 11. The speed sensing means 57 may be wheel mounted sensor mounted to a non-driven wheel of the touring tractor 16 or the component 11 or ground sensing radar means known in the art. The control unit 56 also includes input means by which the operator can set or input the target volume per acre or acre to be sprayed. This enables the application of fumigant to be accurately controlled. Additionally, the control unit 56 provides information to the operator regarding area/acreage treated, speed of the implement, total volume applied, tip monitor, etc.

The flow meter 58 is electronically controlled by the control unit 56 in response to the speed of the implement provided by the component 57 and other information provided to the unit 56. Such control units are known in the art. The control unit 56 used in the preferred embodiment is a Raven SCS 440 Sprayer Control System. In accordance with the present invention, this application rate is intended to be substantially the full application rate depending upon the soil conditions and other factors. A full application rate is commonly about 10 to 100 gallons per acre, more preferably greater than about 15 gallons per acre and most preferably about 20 gallons per acre or more.

The method in accordance with the present application includes applying the fumigant at a desired depth below the surface of the soil at a distance between 2 inches and 12 inches and more preferably at a distance greater than about 6 inches, leveling out the soil surface with a leveling component such as a rotating harrow, packing or packing/pulverizing the soil after the leveling process and planting a cover crop or other seed at a relatively shallow depth of less than 2 inches, more preferably less than 1 inch and most preferably about ½ inch.

Although the description of the preferred embodiment has been quite specific, it is contemplated that various modifications could be made without deviating from the spirit of the present invention. Accordingly, it is intended that the scope of the present invention be dictated by the appended claims rather than by the description of the preferred embodiment.

What is claimed is:

1. An apparatus for simultaneously treating soil with a soil fumigant material applied at a full application rate, and planting a cover crop comprising:
   a fumigant material applicator to apply a soil fumigant below the surface of the soil at a rate of at least about 10 gallons per acre;
   a soil leveling apparatus;
   a soil packer, wherein soil leveling apparatus is positioned between said applicator and said packer; and
   a cover crop seed planter, wherein said soil leveling apparatus and said packer are positioned between said applicator and said planter.

2. The apparatus of claim 1 wherein said applicator includes a chisel plow member and a spray nozzle connected with said plow member.

3. The apparatus of claim 1 wherein said soil leveling apparatus includes a rotating harrow.

4. The apparatus of claim 3 wherein said harrow includes a plurality of rotating harrow sections immediately following said applicator.

5. The apparatus of claim 3 wherein said harrow sections are disposed at an angle relative to the direction of travel of the apparatus.

6. The apparatus of claim 1 wherein said packer is connected directly to said applicator.

7. The apparatus of claim 1 wherein said seed planter is connected directly to said packer.

8. The apparatus of claim 7 wherein said seed planter is a press drill.

9. The apparatus of claim 1 including control means for controlling the application rate of fumigant material in relation to the ground speed.

10. The apparatus of claim 1 wherein said fumigant applicator comprises a fumigant application width and wherein said soil leveling apparatus is effective to level the soil across substantially the entire fumigant application width.

11. The apparatus of claim 10 wherein said soil packer includes a packing surface for packing the soil across substantially the entire fumigant application width.

12. The apparatus of claim 1 including a fumigant material applicator to apply soil fumigant at a rate of at least about 20 gallons per acre.

13. A method of simultaneously treating soil with a soil fumigant material applied at a full application rate, and planting a cover crop comprising the steps of:
   applying a fumigant material to the soil at a depth of greater than two inches and at a rate greater than about 10 gallons per acre;
   leveling the soil following said application step;
   packing the soil following said leveling step; and
   planting seeds for a cover crop in the soil following said packing step with the steps of fumigating, leveling, packing and planting being performed in a single pass.

14. The method of claim 13 including applying the fumigant material below the surface of the soil at a depth of about 2 to 12 inches.

15. The method of claim 14 including applying the fumigant material at a depth of greater than about 6 inches.

16. The method of claim 13 including leveling the soil with a rotating harrow.

17. The method of claim 16 herein said application, leveling, packing and planting steps are performed by an implement moving in a direction of travel and further includes leveling the soil with a plurality of harrow sections positioned at an angle relative to the direction of travel of said implement.

18. The method of claim 13 wherein said application, leveling, packing and planting steps are performed by an implement with a single power source.

19. The method of claim 13 including planting said seeds at a depth of two inches or less.

20. The method of claim 19 including planting said seeds at a depth of one inch or less.

21. The method of claim 13 wherein said application, leveling, packing and planting steps are performed by a moving implement and wherein said method further includes controlling the application of said fumigant material relative to the ground speed of said implement.

22. The method of claim 13 including applying fumigant across a fumigant application width and including leveling the soil across substantially the entire fumigant application width.

23. The method of claim 22 including packing the soil across substantially the entire fumigant application width.

24. The method of claim 13 wherein the fumigant material is applied at a rate greater than about 20 gallons per acre.

* * * * *